United States Patent [19]

Tanaka

[11] Patent Number: 5,377,811
[45] Date of Patent: Jan. 3, 1995

[54] METHOD AND APPARATUS FOR COLLECTING GOODS

[75] Inventor: Nobuhiro Tanaka, Saitama, Japan

[73] Assignee: Kao Corporation, Tokyo, Japan

[21] Appl. No.: 196,654

[22] Filed: Feb. 14, 1994

[30] Foreign Application Priority Data

Feb. 18, 1993 [JP] Japan .................. 5-051330

[51] Int. Cl.⁶ .............................................. B65G 47/30
[52] U.S. Cl. .................. 198/418.6; 198/715
[58] Field of Search ............ 198/715, 433, 418.1, 198/418.2, 418.3, 418.6

[56] References Cited

U.S. PATENT DOCUMENTS

| | | | |
|---|---|---|---|
| 1,973,625 | 9/1934 | Hanna | 198/418.6 |
| 2,125,654 | 8/1938 | Schiff | 198/418.6 |
| 2,856,743 | 10/1958 | Schickendanz | . |
| 3,378,165 | 4/1968 | Eburn et al. | . |
| 3,435,940 | 4/1969 | Seragnoli | 198/418.3 |
| 4,362,235 | 12/1982 | Erdmann | 198/418.3 |

FOREIGN PATENT DOCUMENTS 0471150 2/1992 European Pat. Off. .
963046 7/1964 United Kingdom .

*Primary Examiner*—Cheryl Gastineau
*Attorney, Agent, or Firm*—Dvorak and Traub

[57] ABSTRACT

A method and apparatus for collecting goods with the conveyor (17) having flexible U-shaped goods receptacles (62A) each being in correspondence to the opening of a goods drop-out unit (14). Each goods receptacle (62A) being successively brought to the position of the openings of each goods drop-out unit (14) with intermittent feeding of the conveyor (17) such as to bring each goods receptacles (62A) of the conveyor (17) to the positions of the openings of each goods drop-out units (14). The goods dropped out from each goods drop-out unit (14) being successively collected in each goods receptacle (62A).

5 Claims, 11 Drawing Sheets

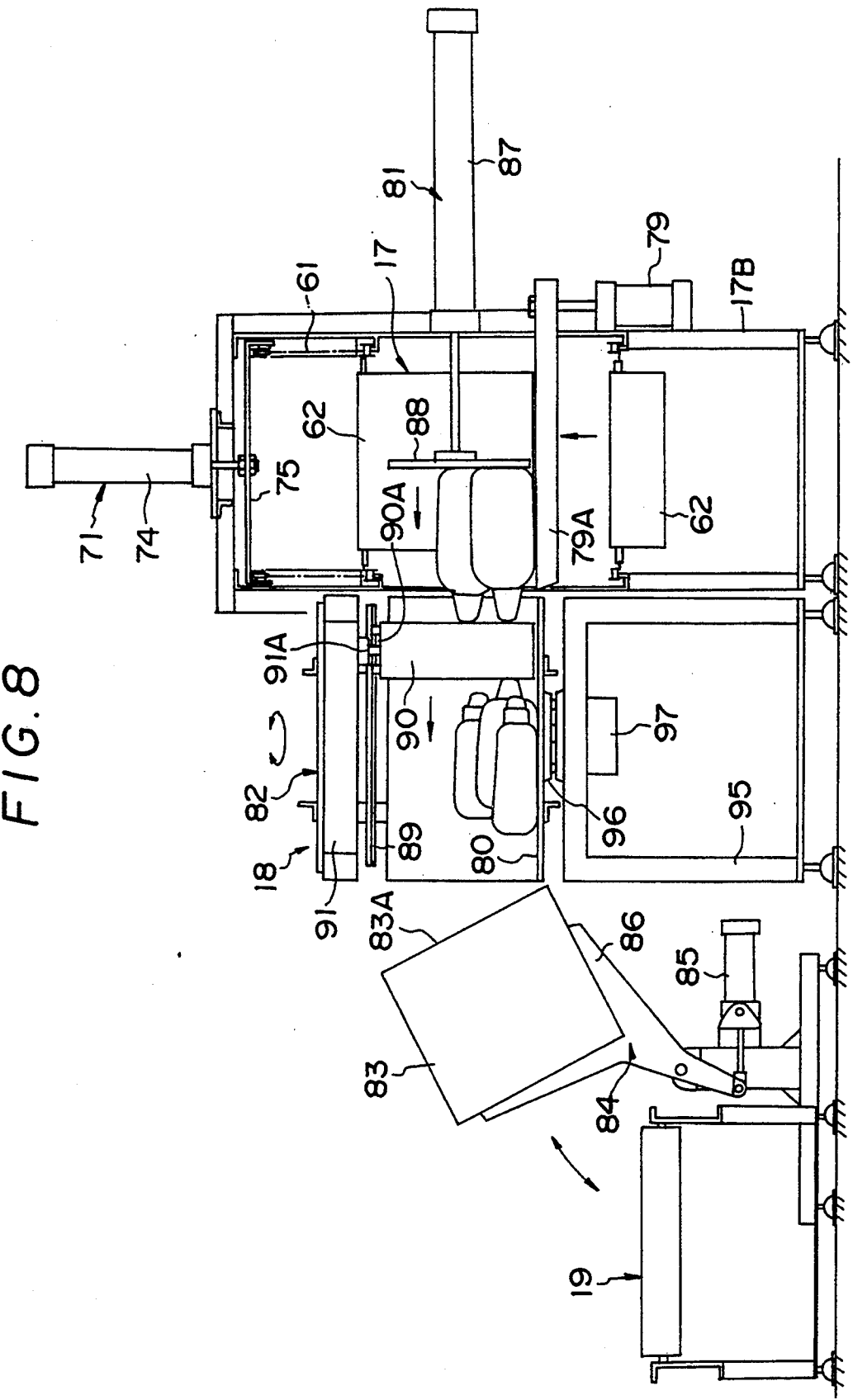

F I G. 10
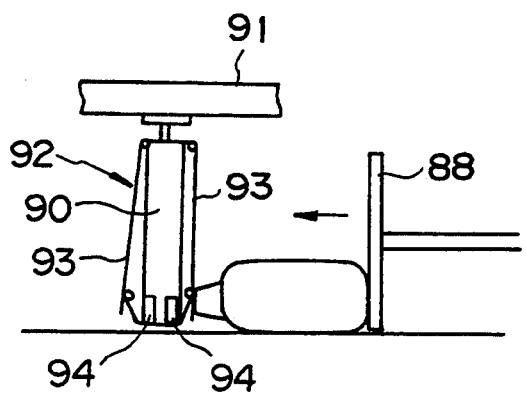

METHOD AND APPARATUS FOR COLLECTING GOODS

BACKGROUND OF THE INVENTION

1. Field of the Invention

The present invention relates to a method and an apparatus for collecting goods.

2. Description of the Background Art

FIG. 11 illustrates a prior art method of collecting goods. This prior art method of collecting goods uses goods drop-out units, each of which can accommodate goods of one kind and dropout a given quantity of goods. A plurality of such goods drop-out units, which are prepared for respective different kinds of goods, are arranged along a goods collection path of a conveyor such that goods dropped out from the individual goods drop-out units are collected in goods receptacles provided in the conveyor. In the FIG. 11, designated at 1A, 1B . . . are goods drop-out units, at 2 is a conveyor, and at 2A, 2B . . . are goods receptacles.

In the above prior art, however, there are at least three major problems.

Since the conveyor 2 is fed continuously at all times, the goods drop-out units 1A, 1B, . . . have to stop the drop-out of goods at a precise timing, at which the borderline between adjacent goods receptacles of the conveyor 2 proceeds past their front. (In the example illustrated in FIG. 11, goods drop-out units 1D and 1H are at the goods drop-out stop timing.) Therefore, there is difficulty in goods drop-out timing control.

Since the conveyor 2 is fed continuously at all times, goods can be dropped out from the goods drop-out units 1A, 1B, . . . only during a period, during which the goods receptacles 2A, 2B, . . . of the conveyor 2 are proceeding past the front of the goods drop-out units 1A, 1B, . . . This means that there is a limit imposed on the maximum quantity of drop-out from the goods drop-out units 1A, 1B . . . .

The goods receptacles 2A, 2B, . . . of the conveyor 2 are hard and planar, have small goods reception capacity and are long such as to correspond to the spaces of a plurality of goods drop-out units. Therefore, if one or more goods receptacles are to be assigned to one container, a long conveyor length is necessary for one container. This means that with a fixed conveyor speed a long time is necessary for the collection of goods for one container.

It is an object of the invention is to facilitate the goods drop-out timing control when collecting goods, to permit increasing the drop-out quantity of goods from the goods drop-out units and to increase the goods collection speed.

SUMMARY OF THE INVENTION

According to the invention, there is provided a method of collecting goods:

using goods drop-out units each for accommodating goods of a single kind and capable of dropping out a given quantity of goods comprising;

arranging a plurality of goods drop-out units prepared for respective different kinds of goods along a goods collection path of a conveyor; and collecting goods dropped out from each goods drop-out unit in a goods receptacle provided in the conveyor which has a flexible U-shaped goods receptacle each provided in correspondence to the opening of each goods drop-out unit;

each goods receptacle being successively brought to the position of the openings of each goods drop-out unit with intermittent feeding of the conveyor such as to bring each goods receptacles of the conveyor to the positions of the openings of each goods drop-out units at a time;

successively collecting in each goods receptacle the goods dropped out from each goods drop-out unit, thereby collecting the plurality of different kinds of goods in the respective goods receptacles.

According to the invention, there is provided an apparatus for collecting goods comprising a plurality of goods drop-out units each for accommodating goods of a single kind and capable of dropping out a given quantity of goods, a conveyor, the goods drop-out units prepared for respective different kinds of goods and being arranged along the goods collection path of a conveyor, and a controller for controlling the goods drop-out units and the conveyor such that goods dropped out from the goods drop-out units are collected in goods receptacle provided in the conveyor;

the conveyor having flexible U-shaped goods receptacles each provided in correspondence to the openings of each goods drop-out unit;

the controller successively bringing each goods receptacle to the position of the openings of each goods drop-out unit by intermittently feeding the conveyor such as to bring the goods receptacles of the conveyor to the positions of the openings of the goods drop-out units at a time and collecting the goods dropped out from each goods drop-out unit successively in each goods receptacle, thereby collecting the plurality of different kinds of goods in the respective goods receptacles.

According to the invention, the following functions are obtainable.

The conveyor is fed intermittently such that its goods receptacles are brought to the positions of the openings of the individual goods drop-out units at a time, and the individual goods drop-out units drop out goods onto the goods receptacles, which correspond to them parallel-wise, at a time (FIG. 12). Thus, it is possible to obtain ready goods drop-out timing control.

With the intermittent feed of the conveyor, the individual goods receptacles thereon are fed for one goods drop-out unit opening after the necessary quantity of goods has been dropped out from the openings of the individual goods drop-out units. It is thus possible to cause only a necessary quantity of goods to be dropped out from each goods drop-out unit, thus permitting an increase of the drop-out quantity of goods (FIG. 12).

The goods receptacles of the conveyor have a flexible U-shaped form and a large goods reception capacity and also have a small length such as to correspond to the opening of a single goods drop-out unit. Thus, when assigning one or more goods receptacles of the conveyor to one container, the conveyor length for one container can be reduced. This means that with a fixed conveyor speed, the goods collection time for one container can be reduced to increase the goods collection speed (FIG. 12).

According to the invention, there is provided an apparatus for collecting goods, in which the conveyor has a plurality of flexible goods receptacle members supported by an endless circulated support member at a plurality of positions thereof in the feeding direction, each goods receptacle member being suspended between an upstream and a downstream support point in a flexible U-shaped form to form a goods receptacle; and means for changing the distance between the upstream and downstream support points of each goods receptacle.

According to the invention, the following function is obtainable.

The U-shaped form of the goods receptacle can be changed by changing the distance between the upstream and downstream support points of the goods receptacle member of the conveyor relative to the support member. That is, the U-shaped goods receptacle becomes wide and shallow by increasing the distance between the support points while it becomes narrow and deep by reducing the distance. The form of the goods in the goods receptacle member is adjusted such as to follow the U-shaped form of the goods receptacle.

According to the invention, there is provided an apparatus for collecting goods, which further comprises a stationary chute extending forward from a position beneath the drop-out opening of the goods drop-out unit to the conveyor and a guide chute extending from the edge of the drop-out opening of the goods drop-out unit up to be over the stationary chute.

According to the invention, the following further function is obtainable.

The guide chute has a curve such that the direction of fall of goods dropped out and falling from the goods drop-out unit is changed smoothly to the direction of the stationary chute. Thus, the goods dropped out and falling from the goods drop-out unit are led smoothly from the guide chute to the stationary chute and do not strike the stationary chute. The goods are thus prevented from damage, and also their orientation is not likely to be deviated on the stationary chute, thus providing for satisfactory goods collection control property in the following steps. Further, the falling speed of the goods, and hence the momentum thereof, is not impeded by any impact with the stationary chute, and there is no possibility that goods are stopped on the stationary chute.

According to the invention, there is provided an apparatus for collecting goods, in which the goods drop-out unit has an opening and closing member for successively opening the drop-out openings, the guide chute having an upper end secured to the opening and closing member of the goods drop-out unit.

According to the invention, the following further function is obtainable.

The guide chute has its upper end secured to the opening and closing member which can open the drop-out openings of each goods drop-out unit. The guide chute is successively brought to the drop-out opening positions of the individual goods drop-out units to be ready for the drop-out of goods. That is, in the goods drop-out unit, there is no need of providing a guide chute for each goods drop-out opening, but a single guide chute can be made to correspond to all the goods drop-out opening. It is thus possible to simplify the construction of the apparatus.

BRIEF DESCRIPTION OF THE DRAWINGS

The present invention will be more fully understood from the detailed description given below and from the accompanying drawings which should not be taken to be a limitation on the invention, but for explanation and understanding only.

The drawings:

FIG. 8 is a schematic view showing a goods loader;

FIG. 10 is a schematic view showing a goods contact sensor;

DESCRIPTION OF THE PREFERRED EMBODIMENT

Figure 1A:
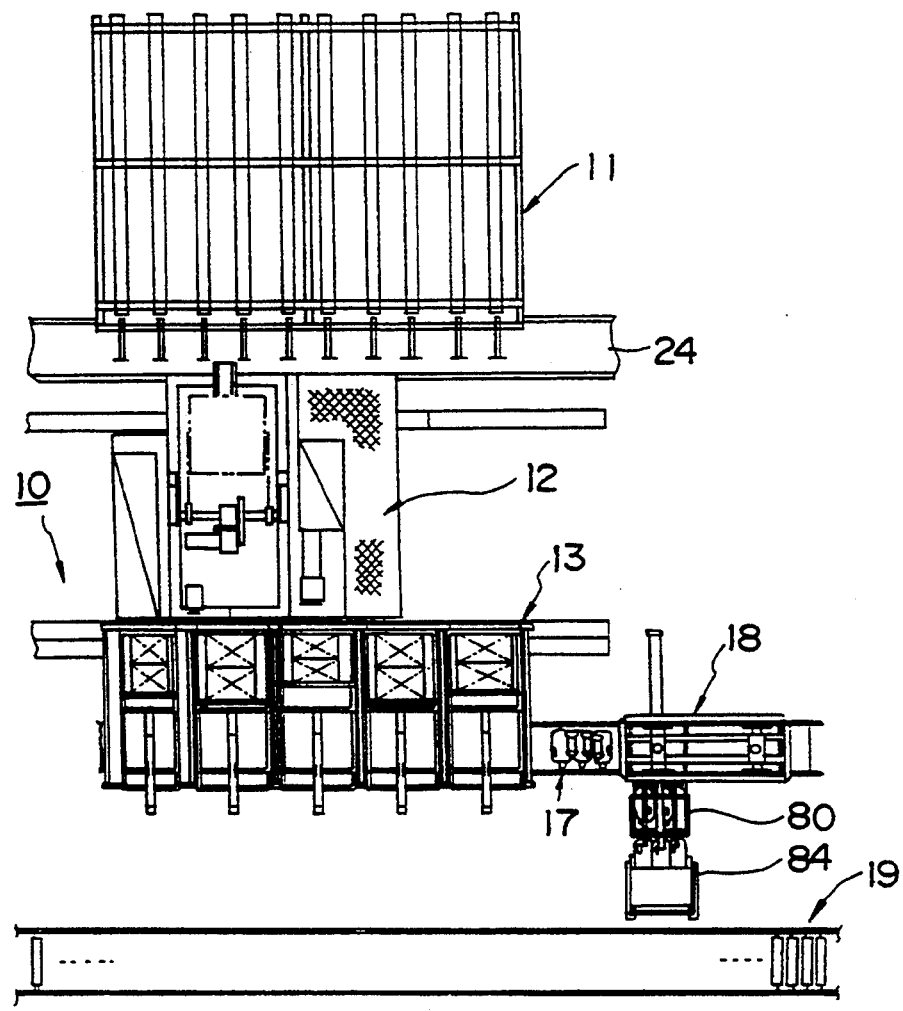
FIGS. 1A and 1B are schematic views showing a picking apparatus.
Figure 1B:
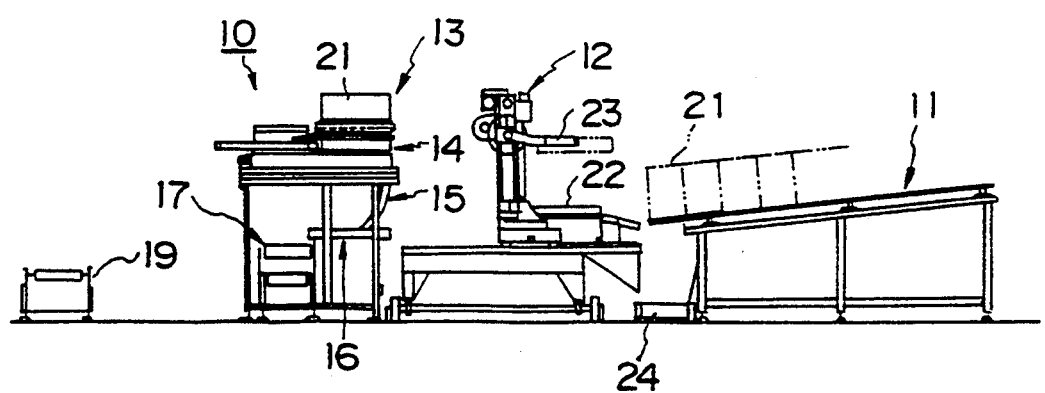

FIGS. 1A and 1B show plan and front views of the a picking apparatus 10 according to the invention. The apparatus comprises a flow shelf 11, a goods feeding robot 12, goods take-out units 13, goods drop-out units 14, a guide chute 15, a stationary chute 16, a goods reception conveyor 17, a goods loader 18, and a container carrying line 19. The individual components of the apparatus will now be described in detail.

(A) Flow Shelf 11 and Goods Feeding Robot 12 (See FIGS. 1A and 1B)

The flow shelf 11 has a plurality of (for instance a first to a twentieth) parallel goods storage zones for storing a plurality of (for instance twenty) different kinds of goods. In each goods storage zone, a row of cardboard cases 21 each containing a plurality of goods or articles of a particular kind are temporarily stored.

The goods feeding robot 12 can run along the forefront of the individual goods storage zones of the flow shelf 11. Specifically, the goods feeding robot 12 picks out each cardboard case 21 in a particular goods storage zone onto a table 22, then mounts a goods take-out unit 13 held by its hands 23 on the top of the cardboard case 21 on the table 22, then turns the cardboard case 21 clamped between the table 22 and the hands 23 by 180 degrees, and then couples the goods take-out unit 13 in this state to the top of a corresponding goods drop-out unit 14. The goods feeding robot 12 also turns an empty cardboard case 21 on a goods drop-out unit 14 together with a corresponding goods take-out unit 13 back toward the forefront of the flow shelf 11 and then allows the empty cardboard case 21 to fall onto a case discharge conveyor 24 which is provided beneath the forefront of the flow shelf 11.

(B) Goods Take-out Unit 13 and Goods Drop-out Unit 14 (FIGS. 1A, 1B, 2 and 4)

A goods take-out unit 13 and a goods drop-out unit 14 are coupled together as a set. The picking apparatus 10 has sets of goods take-out and drop-out units 13 and 14 corresponding in number to the number of (for instance first to twentieth) goods storage zones of the flow shelf 11, i.e., to the number of respective different kinds of goods.

Each goods take-out unit 13 is capable of mounting and dismounting on and out of the top of the adjoining goods drop-out unit 14. After all the goods contained in a cardboard case 21 mounted in the goods take-out unit 13 have been transferred to the lower goods drop-out unit 14 by opening a shutter device 26 of the goods take-out unit 13, a desired number of goods may be dropped out to the side of a guide chute 15 by opening a shutter device 27 of the goods drop-out unit 14.

Figure 4:
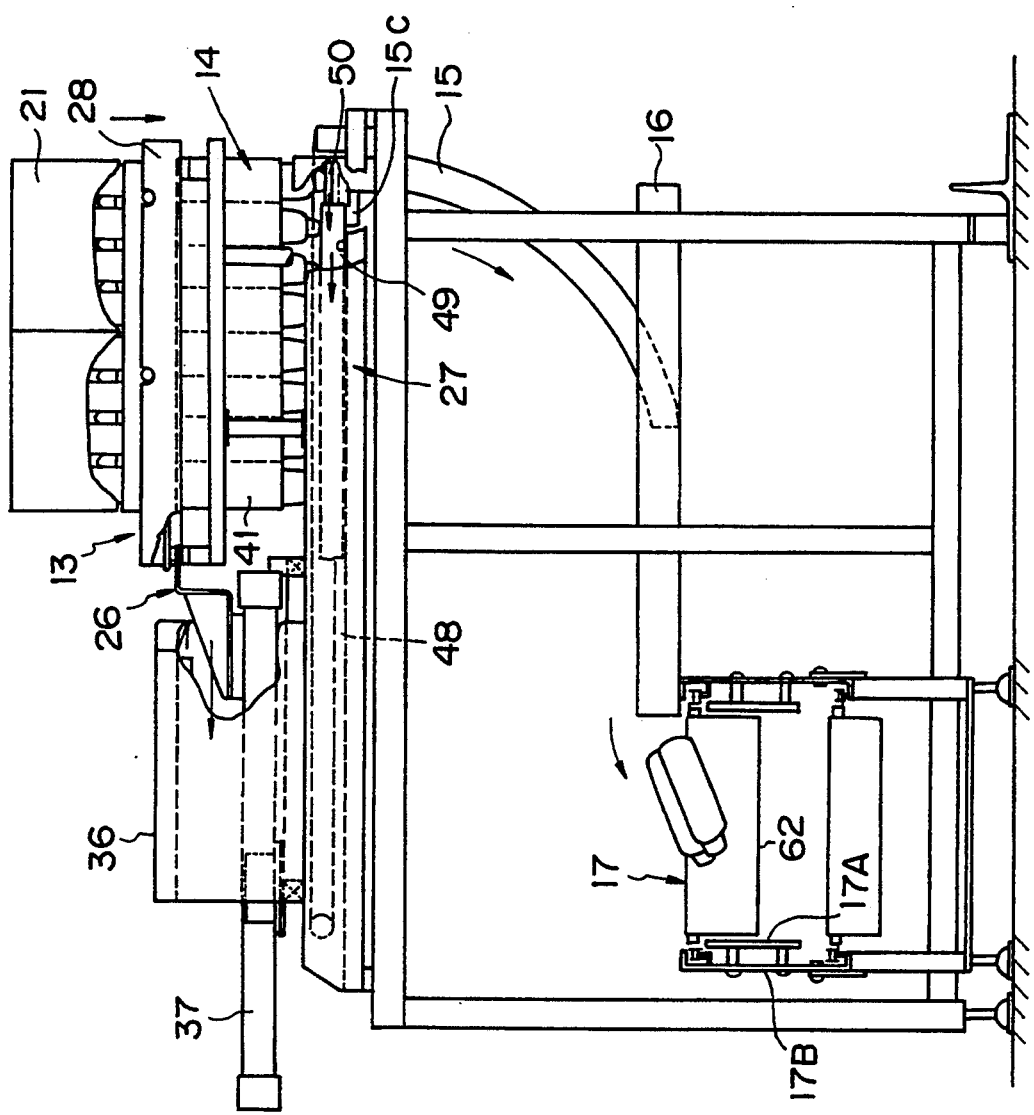
FIG. 4 is a schematic view showing a state of picking out goods from a goods drop-out unit.
Figure 5:
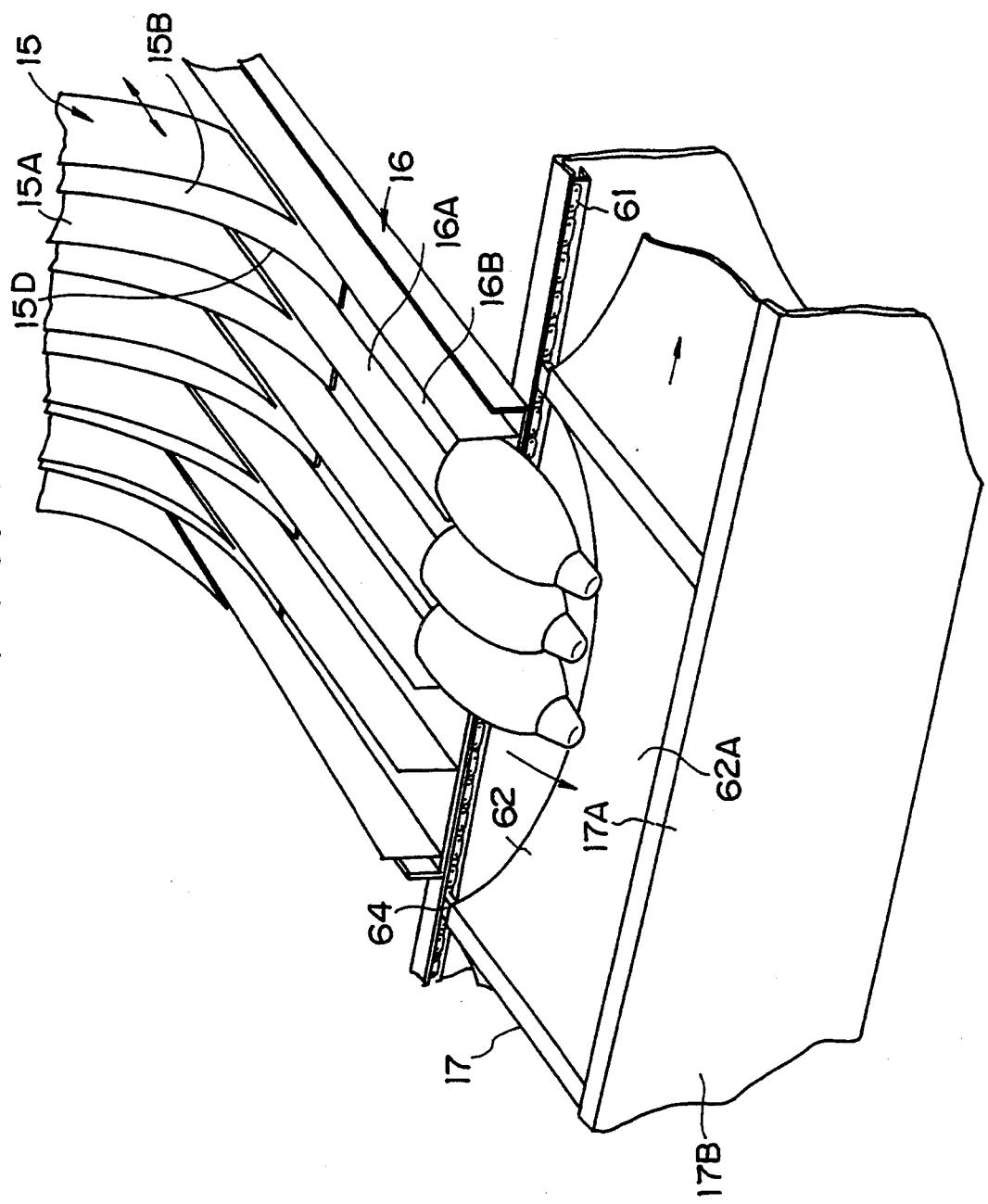
FIG. 5 is a schematic view showing a state of supplying goods from a chute to a goods reception conveyor.
Figure 6:
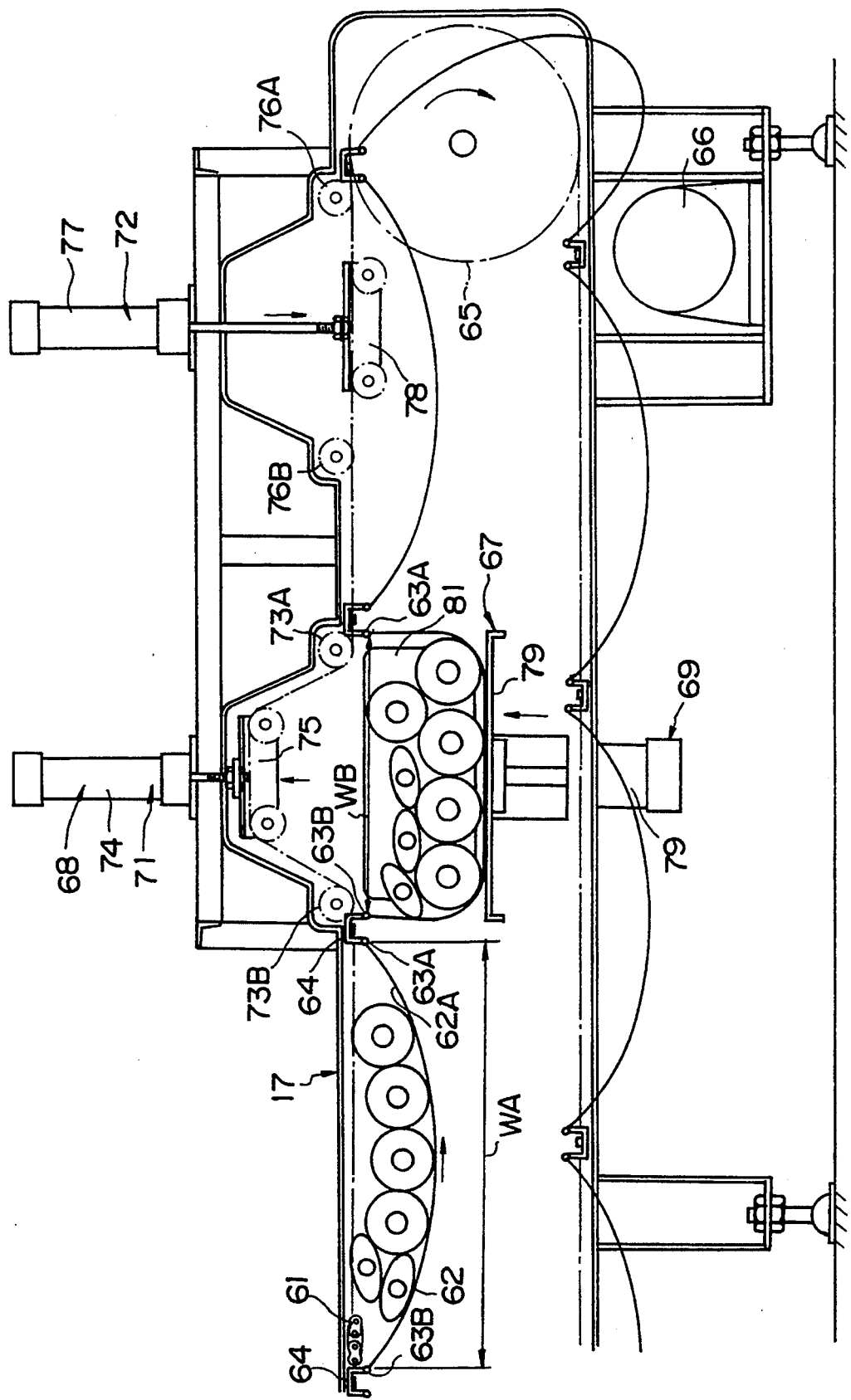
FIG. 6 is a schematic view showing a support point distance adjuster of goods receptacle members provided on a goods reception conveyor.

(C) Guide Chute 15 and Stationary Chute 16 (See FIGS. 4 and 5)

The stationary chute 16, as shown in FIGS. 4 and 5, is disposed beneath each goods drop-out unit 14 and over the entire width (drop-out width) thereof. The rear end of the stationary chute 16 is found directly beneath the drop-out openings of the goods drop-out unit 14, and its front end projects forward from a position beneath the drop-out openings of the goods drop-out unit 14 and faces the goods reception conveyor 17.

The stationary chute 16 has a plurality of upright lane walls 16A disposed in the opposite width direction ends and intermediate positions. These lane walls 16A function as means for regulating the lower end of the guide chute 15 and also function to regulate the moving form (orientation) and moving direction of goods. These lane walls 16A correspond to the borderlines between adjacent drop-out openings of the goods drop-out unit 14 and extend continuously or intermittently over the entire length of the stationary chute 16 from the rear to the front end thereof, thus defining corresponding adjacent lanes 16B.

The guide chute 15, as shown in FIGS. 4 and 5, extends from the drop-out openings of the goods drop-out unit 14 to the top surface of the stationary chute 16 for smoothly guiding goods dropped out and falling from the drop-out openings of the good drop-out unit 14 to the stationary chute 16.

The upper end of the guide chute 15 is secured to a bracket 15C, which is integral with the large opening and closing member 49 of the shutter device 27 of the goods drop-out unit 14. With this arrangement, the guide chute 15 can be automatically positioned with respect to the drop-out openings of the goods drop-out unit 14, from which goods are dropped out by the operation of opening the small opening and closing members 50 provided at the end of the large opening and closing member 49.

The lower end portion of the guide chute 15 depends in a curved fashion such that it is eventually parallel to the top of the stationary chute 16 and also it is in frictional contact with the stationary chute top.

The top of the stationary chute 16 may be held stationary such that it is inclined downward from the side of the goods drop-out unit 14 to the side of the goods reception conveyor 17. In this embodiment, however, it is held stationary such that it is parallel to the opening and closing directions of the shutter device 27. Thus, the distance from the point of securement of the guide chute 15 to the shutter device 27 (i.e., bracket 15C) to the top of the stationary chute 16 is constant, and the height of the guide chute 15 is also constant. Thus, the guide chute 15 may be made of rigid members.

(D) Goods Reception Conveyor (See FIGS. 4 and 5 to 8)

The goods reception conveyor 17 extends along a goods collection path (goods conveying path), which is set to extend from a position corresponding to the front of the guide and stationary chutes 15 and 16 connected to each goods drop-out unit 14 noted above to a position corresponding to a goods loader 18.

The goods reception conveyor 17 has an endless support member (such as chains) 61 travels along the goods collection path. The support member 61 is provided at a plurality of positions along the conveying direction with flexible goods receptacle members (such as belts) 62. Each goods receptacle member 62 has its upstream and downstream support points 63A and 63B in the conveying direction supportedly coupled via pin joints to struts 64 provided at a predetermined interval on the support member 61. It is suspended in a flexible U-shaped form to form a U-shaped goods receptacle 62A. The flexible goods receptacle member 62 is set such that the goods reception width (opening width) WA of the U-shaped goods receptacle 62A in front of the stationary chute 16 is the same as the width of the stationary chute 16 (i.e., opening width of each goods drop-out unit 14). That is, the goods reception conveyor 17 have the goods receptacles 62A each provided in correspondence to the openings of each goods drop-out unit 14.

Alternatively, the individual goods receptacle members 62 may be formed continuously by a single belt member covering the entire length of the support member 61, with an upstream and a downstream support point 63A and 63B provided for each U-shaped goods receptacle 62A bolted to struts 64.

The goods reception conveyor 17 is driven by a motor 66, which drives a drive wheel 65 with the support member 61 passed thereround. Under control of the pick-up controller, the support member 61 is driven intermittently in a timed relation to the drop-out of goods from the goods drop-out unit 14. The goods receptacle members 62 are thus pitch fed at an interval corresponding to the width of the U-shaped goods receptacle 62A, and thus they are brought one after another to a position in front of each stationary chute 16. The goods reception conveyor 17 travels while collecting goods dropped out from each goods drop-out unit 14 in each goods collection section 62A via each stationary chute 16. In this way, each goods receptacle 62A of the goods reception conveyor 17 collects different kinds of goods.

At this time, the goods are dropped by gravity out from each goods drop-out unit 14 along the guide and stationary chutes 15 and 16 in a direction perpendicular to the conveying direction from the side upper position of the goods reception conveyor 17. When the goods are thrown out from the stationary chutes 16, the goods receptacle members 62 are closed on their side opposite the stationary chute side by a stopping member 17A. In this embodiment, the stopping member 17A is provided on a base frame 17B of the goods reception conveyor 17. Alternatively, the stopping member 17A may be provided on the support member 61 or on the good receptacle members 62.

At least a portion of the stopping member 17A, which is struck by goods at the position of throwing of goods from the stationary chutes 16, is suitably made of rubber or like shock absorbing material.

With this arrangement, the goods which have been dropped out from each goods drop-out unit 14 and supplied to the good receptacle member 62 by sliding along the guide and stationary chutes 15 and 16, strike the stopping member 17A. The energy of impact is absorbed by the flexing deformation of the goods receptacle member 62 before the goods are retained in the U-shaped goods receptacle 62A. With the flexing deformation of the goods receptacle member 62, the collected goods retained in the U-shaped goods receptacle 62A are held with their longitudinal direction aligned to the direction perpendicular to the conveying direction of the goods receptacle member 62, in a parallel arrangement.

The pick-out controller previously determines the kinds and quantities of goods to be collected in the individual goods receptacle member 62 of the goods reception conveyor 17 according to the quantity of goods accommodated in the U-shaped goods receptacles 62A. The goods reception conveyor 17 is thus brought to successive positions in front of the individual stationary chutes 16 to collect goods into the goods receptacle members 62 via the stationary chutes 16. After attaining the goods collection plan, it proceeds toward the goods discharge position.

The goods collection plan with respect to the individual goods receptacle members 62 of the goods reception conveyor 17 is executed, for instance, as in (1) to (3) below.

(1) When there are orders from shops A, B . . . as in Table 1 below, the kinds and quantities of goods to be collected in goods receptacle members ①to ④are determined such that the amount of goods accommodated in the goods receptacle members 62 is 40L or less. Here, one goods receptacle member is not assigned for orders of two or more shops. In addition, two or more goods receptacle members are not assigned to the same kind of goods.

(2) Then, drop-out amounts data are supplied to each goods drop-out unit 14 in a timed relation to the pitch feed of the goods reception conveyor 17. Specifically, when the goods receptacle member ① arrives at a first goods drop-out unit 14 (for a goods kind a), a drop-out quantity data of 6 goods is supplied to the first goods drop-out unit 14. If there are other goods receptacle members in front of other goods drop-out units 14 for receiving dropped-out goods, corresponding drop-out quantity data are also supplied.

(3) The goods drop-out units 14 which have received the drop-out quantity data, drop out the instructed quantities of goods.

As an alternative, it is possible to preliminarily supply drop-out quantity data and instruct the drop-out timings.

In the goods reception conveyor 17, a U-shaped form adjuster 67, which permits adjustment of the U-shaped form of the goods receptacle 62A formed by the goods receptacle member 62, is provided at a goods discharge position (i.e., goods collection position) which is disposed downstream of the stationary chutes 16. The U-shaped form adjuster 67 includes a support point distance adjuster 68 for adjusting the distance between the upstream and downstream support points 63A and 63B of each goods receptacle member 62, and a raiser 69 for raising the U-shaped goods receptacle 62A.

The support point distance adjuster 68 has a first and a second support member raiser 71 and 72. The first support member raiser 71 is disposed above the goods discharge position and includes a pulley row 75 which is vertically movable by a cylinder 74. The pulley row 75 can raise a portion of the support member 61 that is found between an upstream and a downstream pulley 73A and 73B spaced apart a distance smaller than the width of the U-shaped goods receptacle 62A to an upper position above the usual conveying path. As a result, the distance between the upstream and downstream support points 63A and 63B of the goods receptacle member 62 that is located at the goods discharge position is changed to a discharge width WB smaller than the goods receptacle member width noted above. The second support member raiser 72 is disposed downstream the first support member raiser 71 and includes a vertically movable pulley row 78 which is vertically movable by a cylinder 77. The pulley row 78 can return the portion of the support member 61 between an upstream and a downstream pulley 76A and 76B spaced apart the same distance as the distance between the pulleys 73A and 73B noted above from the raised position to the level of the normal conveying path. As a result, the redundant length of the support member 61 that has been held at the raised position by the second support member raiser 72, is adjusted to the extent of raising by the first support member raiser 71. Thus, it is possible to alter the distance between the upstream and downstream support points 63A and 63B of the goods receptacle member 62 without loosening the length of the excursion run of the support member 61.

Figure 7A:
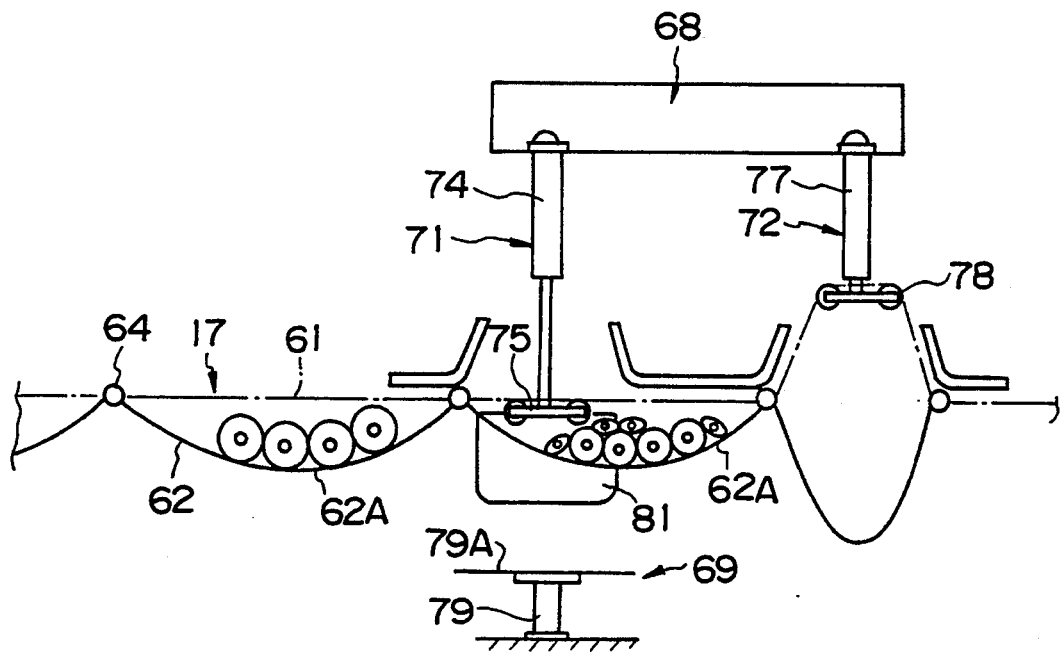
FIGS. 7A and 7B are schematic views illustrating the operation of the support point distance adjuster.
Figure 7B:
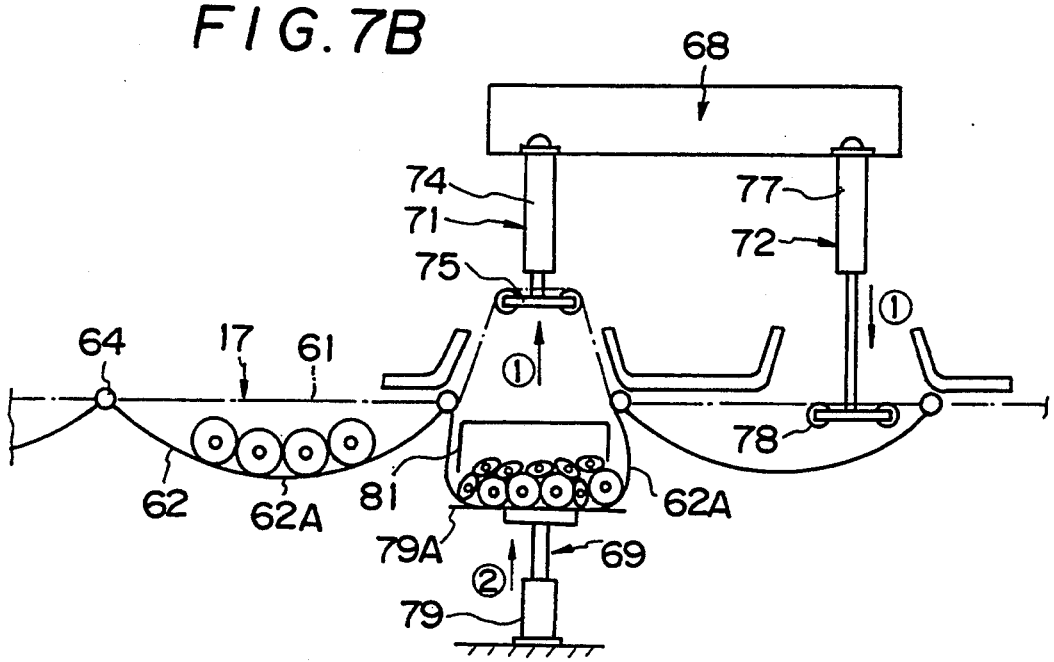

The support point distance adjuster 68, in a goods conveying mode (see FIG. 7(A)), is set by setting the first support member raiser 71 to the normal goods conveying path and setting the second support member raiser 72 to the raised position, the goods receptacle member 62 is moved to bring the U-shaped goods receptacle 62A to the goods discharge position. Then the mode is switched over to a goods discharging mode (see FIG. 7(B)) by setting the first support member raiser 71 to the raised position again and setting the second support member raiser 72 to the normal goods conveying path, and in this mode the U-shaped form of the goods receptacle 62A is adjusted to a narrow width by setting the distance between the upstream and downstream support points 63A and 63B of the goods receptacle member 62.

The miser 69 has a plate 79A, which is disposed beneath the goods discharge position and vertically movable by a cylinder 79. It serves to raise the goods receptacle member 62 that has been adjusted to the width WB and thereby sets the form of the goods in the goods receptacle 62A to a form suited for the handling in the discharge place or station (i.e., form suited to the form of opening of a container 83 (see FIG. 7(B)).

The raiser 69 sets the level of discharge of goods in the goods receptacle member 62 to the goods reception level of a goods reception table 80.

(E) Goods Loader (See FIGS. 8 to 10)

The goods loader 18 has a first and a second transferring means 81 and 82. In the goods discharge position, the first transferring means 81 pushes the goods collected on the goods reception conveyor 17 to the goods reception table 80 which is located sidewise. The second transferring means 82 transfers the goods brought to the goods receptacle table 80 into the container 83 which is disposed sidewise.

At this time, at least at the goods discharge position in the goods conveying path (i.e., a position, at which the U-shaped form of the goods receptacle 62A is adjusted by the U-shaped form adjuster 67) each goods receptacle member 62 has its opposite sides opened.

The position of discharge of goods from the goods reception conveyor 17 and the positions of transfer of goods to the goods reception table 80 and the container 83 are disposed along a line.

The position of transfer of goods to the container 83 is determined near one side of a container conveying line 19. At this position, a container form controller 84 is disposed such that it corresponds to the position of the goods reception table 80. The container form controller 84 has a container holder 86, which can be tilted upwardly by a cylinder 85 from a position beneath the roller conveyor of the container conveying line 19 through and between roller conveyors. The container 83, which is to be set at the goods transfer position, is tilted such that its opening 83A is brought to a position to face the goods reception table 80.

The first transferring means 81 has a transferring plate 88 driven by a cylinder 87. In the goods discharge position, the transferring plate 88 can be inserted into each goods receptacle member 62 from one side opening thereof to push out goods, the form of which has been adjusted in the goods receptacle 62A by the U-shaped from adjuster 67, through the other side opening of the goods receptacle 62.

The second transferring means 82 has a transferring plate 90 which is suspended from a linear guide 89 provided on the goods reception table 80. The transferring plate 90 is driven by a cylinder 91 for reciprocation along the linear guide 89. The cylinder 91 and transferring plate 90 are coupled to each other with a pin coupling between a drive pin 91A of the cylinder 91 and an upper end engagement recess 90A of the transferring plate 90.

The second transferring means 82, as shown in FIG. 10, has a contact sensor 92 for detecting the contact of the end of a goods transferred by the first transferring means 81 with the transferring plate 90. When contact members 93 which are pin coupled to the transferring plate 90 are pushed by the goods to actuate limit switches 94, the contact sensor 92 sends a detection signal. The second transferring means 82 starts its own transferring operation in synchronism to the first transferring means 81 in response to the contact detection signal of the contact sensor 92. Thus, in the second transferring means 82, the front contact member 93 pushes the goods on the goods reception table 80 toward the opening 83A of the container 83, and the goods which are being transferred by the first transferring means 81 from the goods reception conveyor 17 onto the goods reception table 80, can be transferred out of the goods reception conveyor 17 in synchronous operation with the first transferring means 81.

The goods reception table 80 is supported on a table 95 via a ball bearing 96 such that it can be rotated by 360 degrees, and it is driven for rotation by a rotary actuator 97.

The goods loader 18 thus operates as follows.

Figure 9A:
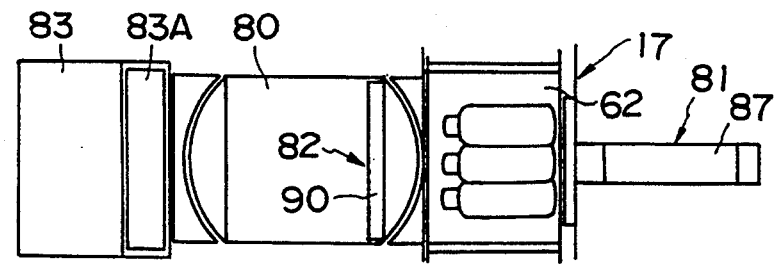
FIGS. 9A to 9F are schematic views illustrating the operation of the goods loader.

(a) The operation commences when goods collected in the goods receptacle member 62 on the goods reception conveyor 17 arrives at the goods discharge position (see FIG. 9(A)). At this time, the U-shaped form adjuster 67 adjusts the U-shaped form of the goods receptacle 62A to set the form of the collected goods in the goods receptacle 62A to one fitted to the opening 83A of the container 83.

Figure 9B:
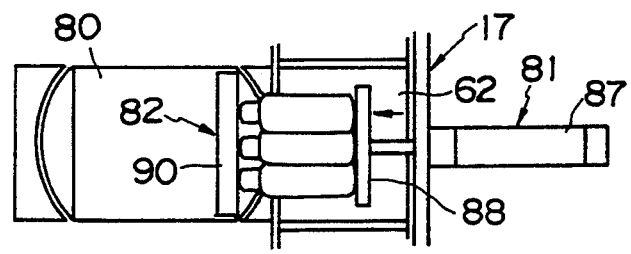

(b) Then, the first transferring means 81 is inserted into the U-shaped goods receptacle 62A from one side opening of the goods receptacle member 62 to transfer the collected goods in the goods receptacle 62A to the side of the goods reception table 80 (see FIG. 9(B)).

Figure 9C:
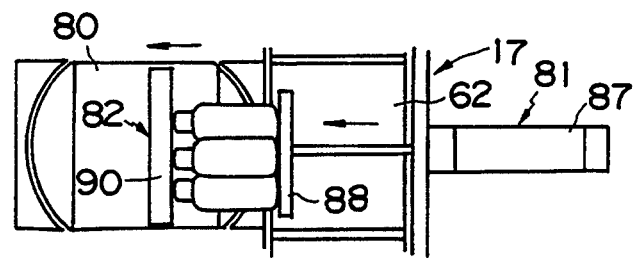

(c) When the contact sensor 92 provided in the second transferring means 82 detects the contact of the end of a goods, the second transferring means 82 starts the transferring operation in synchronism to the first transferring means 81, whereby the goods that are to be transferred from the goods reception conveyor 17 onto the goods reception table 80 are transferred by the first transferring means 81 while they are held in the interval between the transferring plates 88 and 90 of the respective first and second transferring means 81 and 82 (see FIG. 9(C)). At this time, the rate of feeding of the operating fluid in the two cylinders 87 and 91 is set by a throttle valve such that the speed V1 of the transferring plate 88 of the first transferring means 81 and the speed V2 of the transferring plate 90 of the second transferring means 82 are V1≦V2.

Figure 9D:
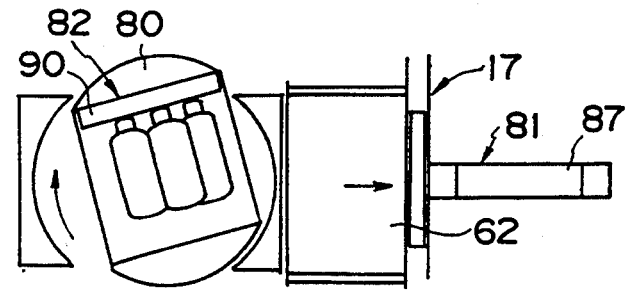

(d) After the goods have been transferred onto the goods reception table 80, the goods reception table 80 is turned 180 degrees (see FIG. 9(D)).

Figure 9E:
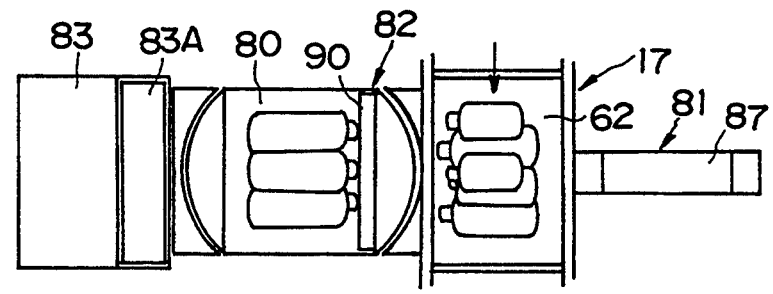

(e) Then, the goods reception conveyor 17 is driven to pitch feed the goods receptacle members 62 to the extent corresponding to the width of the U-shaped goods receptacle 62A for taking out the next collected goods to the goods discharge position (see FIG. 9(E)). At this time, the U-shaped form adjuster adjusts the U-shaped form of the goods receptacle 62A as in the step (a), whereby the form of the next collected goods is set to one fitted to the opening 83A of the container 83.

Figure 9F:
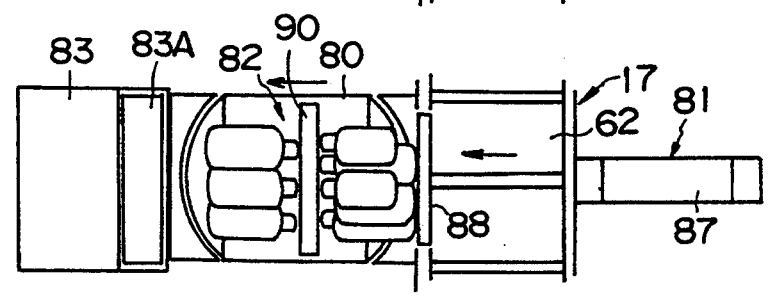
Figure 11:
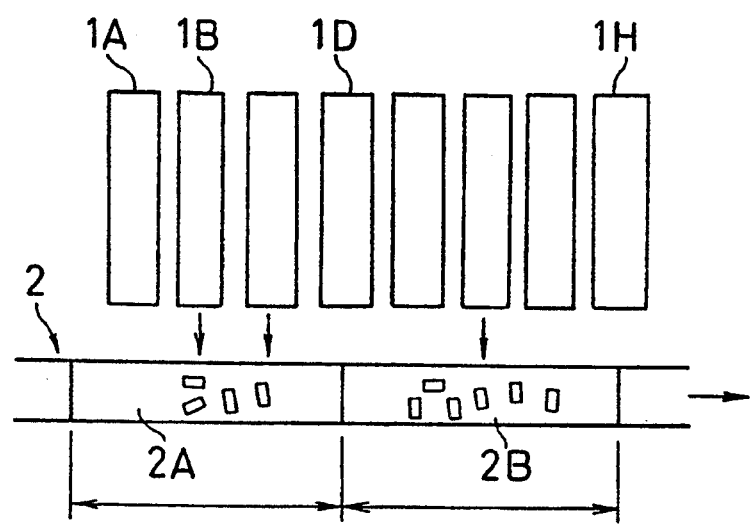
FIG. 11 is a schematic view showing a conception of prior apparatus.

(f) Subsequently, as in the steps (b) and (c) the first and second transferring means 81 and 82 are driven to push and transfer the goods that have been transferred to the goods reception table 80 in the step (d) to the container 83 while at the same time transferring the next goods that are taken in at the goods discharge position in the step (e) from the goods reception conveyor 17 to the goods reception table 80 (see FIG. 9(F)).

Afterwards, the steps (d) to (f) are repeated.

Where the collected goods are cylindrical so that there is no possibility of crushing during the process of transfer from the U-shaped goods receptacle 62A to the goods reception table 80, there is no need of holding the goods in the interval between the two transferring means 81 and 82 by synchronously operating the first and second transferring means 81 and 82.

Figure 2:
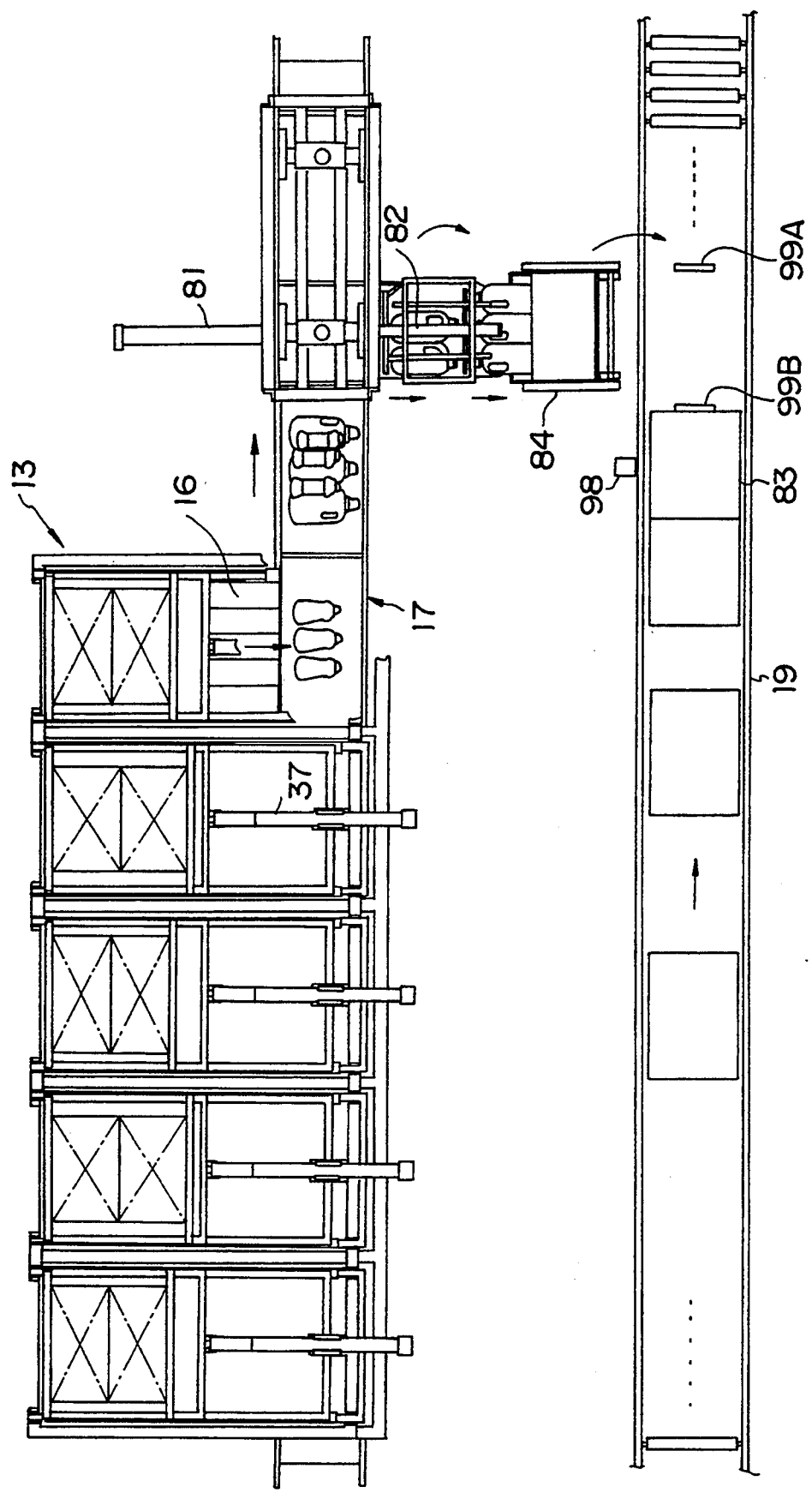
FIG. 2 is a schematic view showing an essential part of the picking apparatus.

(F) Container Conveying Line 19 (See FIGS. 1, 2 and 8)

The container conveying line 19 is a roller conveyor which extends past the position of goods transfer from the goods reception table 80 to the goods conveyor 83.

The container conveying line 19 is provided with a bar code reader 98 and also with stoppers 99A and 99B which are located upstream and downstream of the container form controller 84, respectively.

The pick-out controller reads a bar code applied to each container 83 and determines that the pertinent container 83 is one in which to load goods. When it is found that the container 83 is for loading goods therein, this container is stopped by the downstream side container 99A, and at the same time the succeeding containers 83 are also stopped by the upstream side container 99B. Then, the pertinent container 83 is tilted by the container form controller 84 into a turned-down state such that the opening 83A of the container 83 faces the goods reception table 80.

Figure 3:
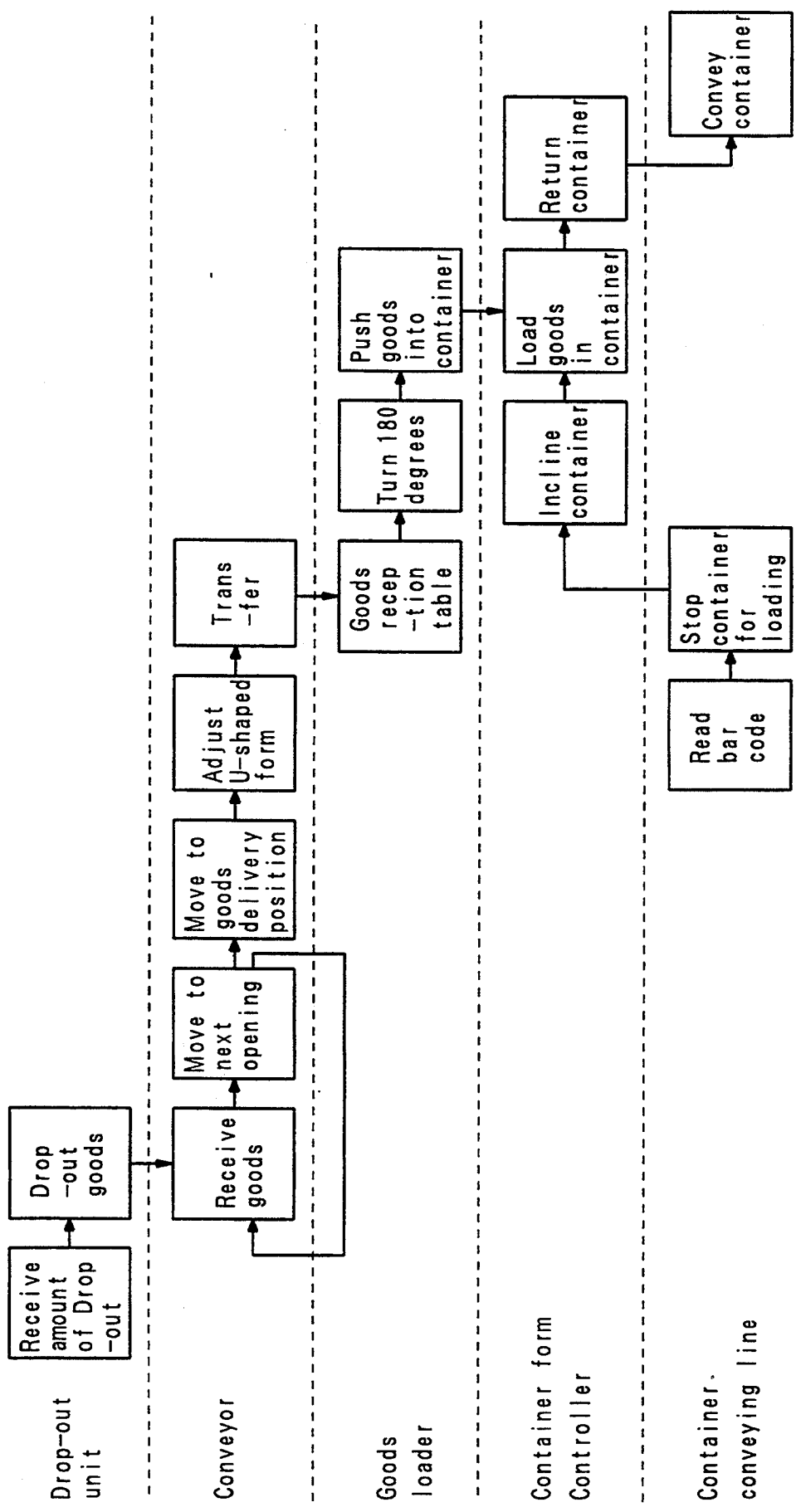
FIG. 3 is a flow chart showing a goods collection process in the picking apparatus.

The specific operation procedure of the picking apparatus 10 is as described in (1) to (4) below (see FIG. 3).

(1) Operation of the Goods Drop-out Units 14

The pick-out controller outputs drop-out goods amount data to corresponding goods drop-out units 14.

Each goods drop-out unit 14 drops out a predetermined number of goods. The dropped-out goods are supplied via guide and stationary chutes 15 and 16 to a predetermined goods receptacle member 62 on the goods reception conveyor 17.

(2) Operation of Goods Reception Conveyor 17

The goods reception conveyor 17 is fed intermittently such as to bring the goods receptacle members 62 to the position of the openings of the goods drop-out units 14 at a time, and it is moved intermittently to bring individual goods receptacle members 62 to successive positions in front of a plurality of goods drop-out units 14 and it proceeds to the goods discharge position to collect the plurality of different kinds of goods in the respective goods receptacles 62A while accommodating goods that may be dropped out from certain goods drop-out units 14 as in the step (1) noted above in pertinent goods receptacle members 62.

When each goods receptacle member 62 arrives at the goods discharge position, the U-shaped form of the U-shaped goods receptacle 62A is adjusted by the support point distance adjuster 68 and raiser 69 of the U-shaped form adjuster 67, whereby the form of the goods in the goods receptacle 62A is set to one fitted to the opening 83A of the container 83 to be discharged.

(3) Operation of Goods Loader 18

At the goods discharge position, goods that have been collected in each goods receptacle member 62 on the goods reception conveyor 17 are pushed and transferred by the first transferring means 81 to the goods reception table 80 which is disposed sidewise. The goods transferred to the goods reception table 80 are transferred into a container 83 located sidewise by the second transferring means 82.

Prior to the transfer of goods from the goods reception table 80 to the container 83 by the second transferring means 82, the goods reception table 80 is turned to change the orientation of the goods on the goods reception table 80 by 180 degrees. Thus, the goods are supplied with the bottom down to the container 83 so that the bottom of the goods can be placed on the inner surface of the open container 83.

(4) Operation of Container Conveying Line 19

Whether a container 83 is one in which to load goods, is determined by the reading of a bar code on the container 83.

If the container 83 is one which to load goods, it is tilted by the container form controller 84 to a position, at which the opening 83A of the container 83 faces the goods reception table 80.

In the step (3) noted above, the goods pushed by the second transferring means 82 are brought into the container 83.

After the goods are loaded in the container 83, the container 83 is brought back by the container form controller 84 to the container conveying line 19.

The container 83 is then conveyed to the next step.

Now, the operation of this embodiment will be described.

(1) Since the goods receptacle members 62 of the goods reception conveyor 17 are flexible, the impact force produced when goods are thrown into each goods receptacle member 62 can be absorbed by the flexing deformation of the goods receptacle member 62 thus reducing damage to the goods and noise. In addition, owing to the flexibility of the goods receptacle member 62, the thrown goods can be held in nearly arranged form (in which the goods are in a neatly arranged parallel state in the longitudinal direction) with the flexing deformation of the goods receptacle member 62 such as to fit the shape of the goods. For example, a plurality of goods can be held in a stable state of arrangement in the longitudinal direction.

(2) The U-shaped form of the goods receptacle 62A of the goods receptacle member 62 on the goods reception conveyor 17 is changed by changing the distance between the upstream and downstream support points of the member 62 relative to the support member 61. That is, the U-shaped goods receptacle 62A becomes wide and shallow by increasing the support point distance while it becomes narrow and deep by reducing the support point distance. The form of the goods in the goods receptacle member 62 is adjusted such as to be defined by the U-shaped form of the goods receptacle member 62A.

(3) The guide chutes 15 each have a curve such that the direction of fall of goods dropped out and falling from the goods drop-out unit 14 is changed smoothly to the direction of the stationary chute 16. Thus, the goods dropped out and falling from the goods drop-out unit 14 are led smoothly from the guide chute 15 to the stationary chute 16 and do not strike the stationary chute 16. Thus, the goods are not likely to be damaged, and also their orientation is not likely to be deviated on the stationary chute 16, thus providing for satisfactory goods collection control property in the following steps. Further, the falling speed of the goods is not impeded by any impact with the stationary chute 16, and the goods are not stopped on the stationary chute 16.

(4) The guide chute 15 has its upper end secured to the opening and closing member 49 which can open the drop-out openings of each goods drop-out unit 14. The guide chute 15 is successively brought to the positions of the individual goods drop-out units 14. That is, there is no need of providing a guide chute 15 for each goods drop-out unit 14, but a single guide chute 15 can be made to correspond to all the goods drop-out unit 14. It is thus possible to simplify the construction of the apparatus.

(5) Since the top of the stationary guide chute 16 extends parallel to the direction of opening and closing of the opening and closing member 49, the distance between the point of securement of the guide chute 15 to the opening and closing member 49 to the top surface of the stationary chute 16 is constant, and thus the height of the guide chute 15 can be made constant. This means that the guide chute 15 may be made of rigid material and thus can be readily produced. Where the guide chute 15 is made of rigid material, its lanes 15B may have a substantially rigid structure, permitting stable movement of goods.

(6) Since the lower end portion of the guide chute 15 depends such that it is eventually parallel to the top surface of the stationary chute 16, the goods discharged from the guide chute 15 can be led very smoothly in a sliding state to the stationary chute 16.

Figure 12:
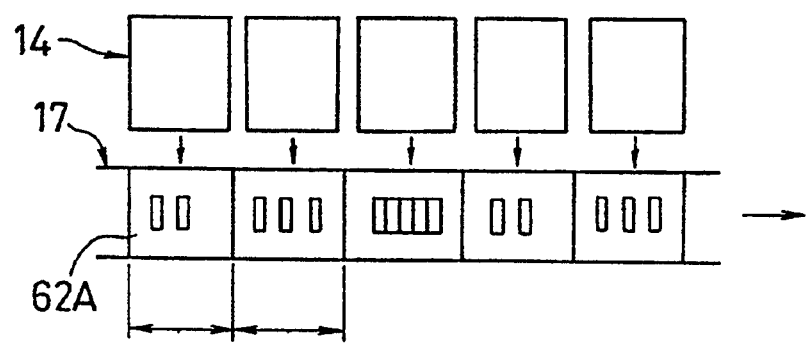
FIG. 12 is a schematic view showing a conception of the inventive apparatus.

(7) The conveyor 17 is fed intermittently such that its goods receptacles 62A are brought to the positions of the openings of the individual goods drop-out units 14 at a time, and the individual goods drop-out units 14 drop out goods onto the goods receptacles 62A, which correspond to them parallel-wise, at a time (FIG. 12). Thus, it is possible to obtain ready goods drop-out timing control.

(8) With the intermittent feed of the conveyor 17, the individual goods receptacles 62A thereon are fed for one goods drop-out unit opening after the necessary quantity of goods has been dropped out from the openings of the individual goods drop-out units 14. It is thus possible to cause only a necessary quantity of goods to be dropped out from each goods drop-out unit 14, thus permitting an increase of the drop-out quantity of goods (FIG. 12).

(9) The goods receptacles 62A of the conveyor 17 have a flexible U-shaped form and a large goods reception capacity and also have a small length such as to correspond to the opening of a single goods drop-out unit 14. Thus, when assigning one or more goods receptacles 62A of the conveyor 17 to one container 83, the conveyor length for one container can be reduced. This means that with a fixed conveyor speed, the goods collection time for one container can be reduced to increase the goods collection speed (FIG. 12).

As set forth above, according to the present invention, the goods drop-out timing control is facilitated when collecting goods, and the drop-out quantity of goods from the goods drop-out units and the goods collection speed can be increased.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

TABLE 1

| kind (Section) | Quantity | Goods storage amount | | Assigned goods receptacle member |
| --- | --- | --- | --- | --- |
| Shop A  a (1) | 6 | 12L | | |
|  b (3) | 12 | 21L | } 38L | →① |
|  c (7) | 6 | 5L | | |
|  d (8) | 6 | 16L | | |
|  e (9) | 3 | 5L | } 32L | →② |
|  f (11) | 6 | 11L | | |
|  g (15) | 6 | 9L | | →③ |
|  h (20) | 3 | 5L | } 14L | |
| Shop B | — | — | | —④ |

What is claimed is:

1. A method of collecting goods comprising:
using goods drop-out units each for accommodating goods of a single kind and capable of dropping out a given quantity of goods comprising;
arranging a plurality of goods drop-out units prepared for respective different kinds of goods along a goods collection path of a conveyor; and
collecting goods dropped out from each goods drop-out unit in a goods receptacle provided in the conveyor which has a flexible U-shaped goods receptacle each provided in correspondence to the opening of each goods drop-out unit;
each goods receptacle being successively brought to the position of the openings of each goods drop-out unit with intermittent feeding of the conveyor such as to bring each goods receptacles of the conveyor to the positions of the openings of each goods drop-out units at a time;
successively collecting in each goods receptacle the goods dropped out from each goods drop-out unit, thereby collecting the plurality of different kinds of goods in the respective goods receptacles.

2. An apparatus for collecting goods comprising a plurality of goods drop-out units each for accommodating goods of a single kind and capable of dropping out a given quantity of goods, a conveyor, the goods drop-out units prepared for respective different kinds of goods and being arranged along a goods collection path of the conveyor, and a controller for controlling the goods drop-out units and the conveyor such that goods dropped out from the goods drop-out units are collected in goods receptacle provided in the conveyor;
the conveyor having flexible U-shaped goods receptacles each provided in correspondence to the opening of each goods drop-out unit;
the controller successively bringing each goods receptacle to the position of the openings of each goods drop-out unit by intermittently feeding the conveyor such as to bring the goods receptacles of the conveyor to the positions of the openings of the goods drop-out units at a time and collecting the goods dropped out from each goods drop-out unit successively in each goods receptacle, thereby collecting the plurality of different kinds of goods in the respective goods receptacles.

3. The apparatus for collecting goods according to claim 2, wherein the conveyor has a plurality of flexible goods receptacle members supported by an endless circulated support member at a plurality of positions thereof in the feeding direction, each goods receptacle member being suspended between an upstream and a downstream support point in a flexible U-shaped form to form a goods receptacle; and
means for changing the distance between the upstream and downstream support points of each goods receptacle.

4. The apparatus for collecting goods according to claim 2, which further comprises a stationary chute extending forward from a position beneath the drop-out opening of the goods drop-out unit to the conveyor and a guide chute extending from the edge of the drop-out opening of the goods drop-out unit over the stationary chute.

5. The apparatus for collecting goods according to claim 4, wherein the goods drop-out unit has an opening and closing member for successively opening the drop-out openings, the guide chute having an upper end secured to the opening and closing member of the goods drop-out unit.

* * * * *